(12) United States Patent
Lee

(10) Patent No.: US 10,277,583 B2
(45) Date of Patent: *Apr. 30, 2019

(54) SYSTEM, METHOD AND COMPUTER PROGRAM PRODUCT FOR AUTHENTICATING AND AUTHORIZING AN EXTERNAL ENTITY

(71) Applicant: salesforce.com, inc., San Francisco, CA (US)

(72) Inventor: Jong Lee, Pleasanton, CA (US)

(73) Assignee: salesforce.com, inc., San Francisco, CA (US)

( * ) Notice: Subject to any disclaimer, the term of this patent is extended or adjusted under 35 U.S.C. 154(b) by 219 days.

This patent is subject to a terminal disclaimer.

(21) Appl. No.: 15/091,558

(22) Filed: Apr. 5, 2016

(65) Prior Publication Data

US 2016/0294807 A1    Oct. 6, 2016

Related U.S. Application Data

(63) Continuation of application No. 14/146,666, filed on Jan. 2, 2014, now abandoned, which is a continuation of application No. 12/947,760, filed on Nov. 16, 2010, now Pat. No. 8,646,048.

(60) Provisional application No. 61/319,794, filed on Mar. 31, 2010.

(51) Int. Cl.
*H04L 29/06* (2006.01)
*G06F 21/62* (2013.01)
*G06F 21/31* (2013.01)

(52) U.S. Cl.
CPC ............ *H04L 63/083* (2013.01); *G06F 21/31* (2013.01); *G06F 21/6218* (2013.01); *G06F 21/6245* (2013.01); *H04L 63/08* (2013.01); *H04L 63/0807* (2013.01); *H04L 63/0884* (2013.01); *H04L 63/10* (2013.01)

(58) Field of Classification Search
CPC ............ H04L 63/0807; H04L 63/0815; H04L 63/0884
USPC .......................................................... 726/4
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |

(Continued)

OTHER PUBLICATIONS

Craig Weissman, "Programming Language Method and System for Extending APIS to Execute in Conjunction With an On-Demand Database Service," U.S. Appl. No. 60/828,192, filed Oct. 4, 2006, 66 pages.

*Primary Examiner* — David J Pearson
(74) *Attorney, Agent, or Firm* — Meyertons, Hood, Kivlin, Kowert & Goetzel, P.C.

(57) ABSTRACT

In accordance with embodiments, there are provided mechanisms and methods for authenticating and authorizing an external entity. These mechanisms and methods for authenticating and authorizing an external entity can enable improved data security, more efficient data transfer, improved data access channels, etc.

18 Claims, 4 Drawing Sheets

(56) References Cited

U.S. PATENT DOCUMENTS

| | | |
|---|---|---|
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,209,929 B2 | 4/2007 | Dominguez, Jr. et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,779,039 B2 | 8/2010 | Weissman et al. |
| 8,015,495 B2 | 9/2011 | Achacoso et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,140,576 B1 | 3/2012 | Viripaeff et al. |
| 8,275,836 B2 | 9/2012 | Beaven et al. |
| 8,457,545 B2 | 6/2013 | Chan |
| 8,484,111 B2 | 7/2013 | Frankland et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2003/0233404 A1 | 12/2003 | Hopkins |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0065925 A1 | 3/2005 | Weissman et al. |
| 2005/0091098 A1 | 4/2005 | Brodersen et al. |
| 2005/0154730 A1 | 7/2005 | Miller et al. |
| 2005/0223022 A1 | 10/2005 | Weissman et al. |
| 2005/0283478 A1 | 12/2005 | Choi et al. |
| 2006/0021019 A1 | 1/2006 | Hinton et al. |
| 2006/0059546 A1 | 3/2006 | Nester et al. |
| 2006/0090197 A1* | 4/2006 | Hermann ............ H04L 63/0823 726/5 |
| 2006/0206834 A1 | 9/2006 | Fisher et al. |
| 2007/0130130 A1 | 6/2007 | Chan et al. |
| 2008/0148099 A1 | 6/2008 | Bhat et al. |
| 2008/0249972 A1 | 10/2008 | Dillon |
| 2008/0281610 A1 | 11/2008 | Yoshida et al. |
| 2009/0006416 A1* | 1/2009 | Krahulec ............ G06F 17/30893 |
| 2009/0063415 A1 | 3/2009 | Chatfield et al. |
| 2009/0064303 A1* | 3/2009 | Dickinson ............ G06Q 10/06 726/10 |
| 2009/0100342 A1 | 4/2009 | Jakobson |
| 2009/0177744 A1 | 7/2009 | Marlow et al. |
| 2009/0249440 A1* | 10/2009 | Platt ............ H04L 63/0815 726/1 |
| 2010/0145774 A1 | 6/2010 | Veshnyakov et al. |
| 2010/0251340 A1 | 9/2010 | Martin et al. |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2013/0218948 A1 | 8/2013 | Jakobson |
| 2013/0218949 A1 | 8/2013 | Jakobson |
| 2013/0218966 A1 | 8/2013 | Jakobson |

(56) References Cited

U.S. PATENT DOCUMENTS

| | | |
|---|---|---|
| 2013/0247216 A1 | 9/2013 | Cinarkaya et al. |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |

\* cited by examiner

SYSTEM, METHOD AND COMPUTER PROGRAM PRODUCT FOR AUTHENTICATING AND AUTHORIZING AN EXTERNAL ENTITY

CLAIM OF PRIORITY

The present application is a continuation of U.S. application Ser. No. 14/146,666, filed Jan. 2, 2014, which is a continuation of U.S. application Ser. No. 12/947,760, filed Nov. 16, 2010 (now U.S. Pat. No. 8,646,048), which claims priority to U.S. Provisional Appl. No. 61/319,794, filed Mar. 31, 2010; the disclosures of each of the above-referenced applications are incorporated by reference herein in their entireties.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to data security, and more particularly to authenticating an external entity.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Data security is a common concern of conventional systems. For example, a user of a system may desire to protect their authentication information used for gaining access to the system, especially in situations where access to the system is desired by an entity associated with the user that is external to the system. Unfortunately, conventional security and access techniques have been associated with various limitations.

Just by way of example, traditional methods of authenticating and authorizing an entity external to the system include requiring a user to reveal user credentials such as usernames and passwords to the external entity. As a result, this process may pose certain security risks to the entity. Accordingly, it is desirable to provide techniques that improve the authentication and authorization of external entities.

BRIEF SUMMARY

In accordance with embodiments, there are provided mechanisms and methods for authenticating and authorizing an external entity. These mechanisms and methods for authenticating and authorizing an external entity can enable improved data security, more efficient data transfer, improved data access channels, etc.

In an embodiment and by way of example, a method for authenticating and authorizing an external entity is provided. In one embodiment, a request is received from an external entity for user data stored in a multi-tenant on-demand database system. Additionally, the external entity is authenticated and authorized. Further, the user data is conditionally returned to the external entity, based on the authentication and authorization.

While one or more implementations and techniques are described with reference to an embodiment in which authenticating and authorizing an external entity is implemented in a system having an application server providing a front end for an on-demand database system capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for authenticating and authorizing an external entity.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers.

Next, mechanisms and methods for authenticating and authorizing an external entity will be described with reference to example embodiments.

Figure 1:
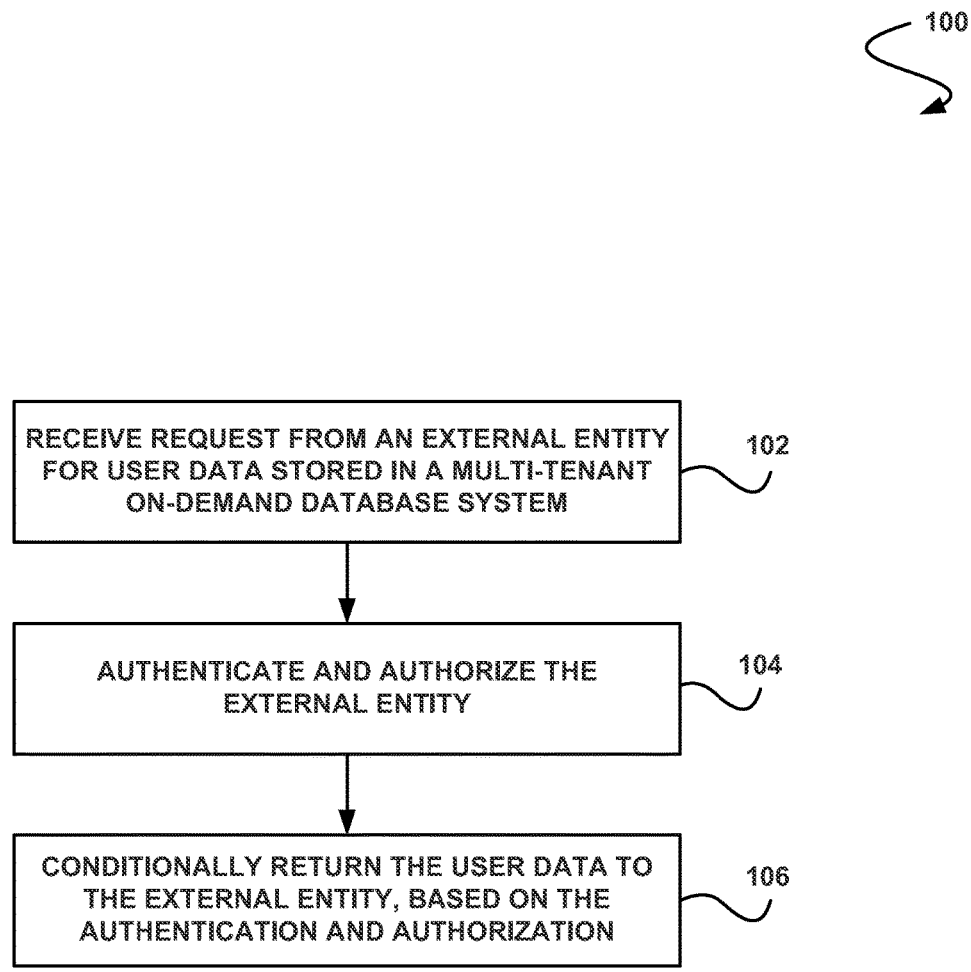
FIG. 1 illustrates a method for authenticating and authorizing an external entity, in accordance with one embodiment.

FIG. 1 illustrates a method 100 for authenticating and authorizing an external entity, in accordance with one embodiment. As shown in operation 102, a request is received from an external entity for user data stored in a multi-tenant on-demand database system. In the context of the current embodiment, the external entity may include any entity that is external to the multi-tenant on-demand database system (e.g., not part of the multi-tenant on-demand database system, etc.). For example, the external entity may include a third-party application (e.g., an external enterprise application, an Internet application, web site, etc.), a system partner integration, etc. In another embodiment, the external entity may be associated with the user. For example, the external entity may be providing a service to the user. In another example, the user may be registered and/or logged in to the third-party application.

Additionally, in one embodiment, the user data may include one or more files within the multi-tenant on-demand database system. For example, the user data may include one or more image files, one or more contacts, one or more records, etc. In another embodiment, the user data may include data associated with the user of the multi-tenant on-demand database system (e.g., an administrator/administrative user, a client, a customer, etc.). For example, the user data may be associated with an account of the user. In another example, the data may be associated with a user organization of the multi-tenant on-demand database system.

Further, in another embodiment, the request may be received at the multi-tenant on-demand database system. For example, the request may be received at an instance of the multi-tenant on-demand database system. In another embodiment, the request may be associated with an action provided by the external entity on behalf of the user. For example, the external entity may provide a service to the user, where the service requires the user data stored in the multi-tenant on-demand database system. In yet another embodiment, the request may include a request to log in to the multi-tenant on-demand database system.

In another embodiment, the request may be routed from the instance of the multi-tenant on-demand database system where it is received to an instance in the system where an organization associated with the user is present. For example, the user may enable remote access for the external entity (e.g., by creating a remote access object for the external entity in the multi-tenant on-demand database system, etc.) within the organization associated with the user, where the organization is located within an instance of the multi-tenant on-demand database system. In another embodiment, remote access for the external entity may be enabled utilizing an interface (e.g., a user interface, a setup page, etc.). In yet another embodiment, a key used to identify the external entity, along with corresponding security information (e.g., one or more of a secret, a password, a token, encrypted data, etc.), may be generated when the remote access object is created. In one embodiment, the key and corresponding security information may be different from the user's login information for the multi-tenant on-demand database system. Additionally, in another embodiment, the key and the security information may be globally replicated to all instances within the multi-tenant on-demand database system. In this way, regardless of which instance the external entity sends the request to, the request may be routed back to the correct instance containing the related organization.

Additionally, it should be noted that, as described above, such multi-tenant on-demand database system may include any service that relies on a database system that is accessible over a network, in which various elements of hardware and software of the database system may be shared by one or more customers (e.g. tenants). For instance, a given application server may simultaneously process requests for a great number of customers, and a given database table may store rows for a potentially much greater number of customers. Various examples of such a multi-tenant on-demand database system will be set forth in the context of different embodiments that will be described during reference to subsequent figures.

Further still, as shown in operation 104, the external entity is authenticated and authorized. In one embodiment, authorizing the external entity may include redirecting the request to a login page of the multi-tenant on-demand database system. For example, when the external entity requests user data from the multi-tenant on-demand database system for the first time, the user may be presented with a login page at the multi-tenant on-demand database system. In another example, the user may grant access permission to the external entity via the login page, utilizing the user's login information (e.g., user name and password, etc.).

In another embodiment, authenticating and authorizing the external entity may include exchanging security information between the external entity and the multi-tenant on-demand database system. For example, the security information (e.g., the security information generated in response to the user creating the remote access object in the system, etc.) may be provided to the external entity after the user grants access permission to the external entity via the login page. Additionally, in another example, the external entity may provide the security information to the multi-tenant on-demand database system (e.g., in response to a request by the system, with the request for the user data, etc.), and the multi-tenant on-demand database system may authenticate the external entity utilizing the security information. In yet another example, the authentication information may be different from the user's login information.

Also, as shown in operation 106, the user data is conditionally returned to the external entity, based on the authentication and authorization. In one embodiment, the user data may be returned to the external entity if the external entity is authenticated by the multi-tenant on-demand database system and authorized by the user. For example, the user data may be returned to the external entity if the security information received from the external entity matches the security information associated with the external entity in the system. In another example, the user data may be returned to the external entity if the user grants access permission to the external entity.

In another embodiment, the user data may not be returned to the external entity if the external entity is not authenticated by the multi-tenant on-demand database system and/or not authorized by the user. For example, the user data may not be returned to the external entity if the security information received from the external entity does not match the security data associated with the external entity in the system, if the user does not grant access permission to the external entity, if the user revokes access permission for the external entity, etc. In this way, the user's login information may not need to be provided to the external entity in order for the multi-tenant on-demand database system to authenticate the external entity. Additionally, a secure channel may be provided for the external entity to access secure data from the system within an organization of the user of the system, etc.) without exposing sensitive authorization information of the user to the external entity.

Figure 2:
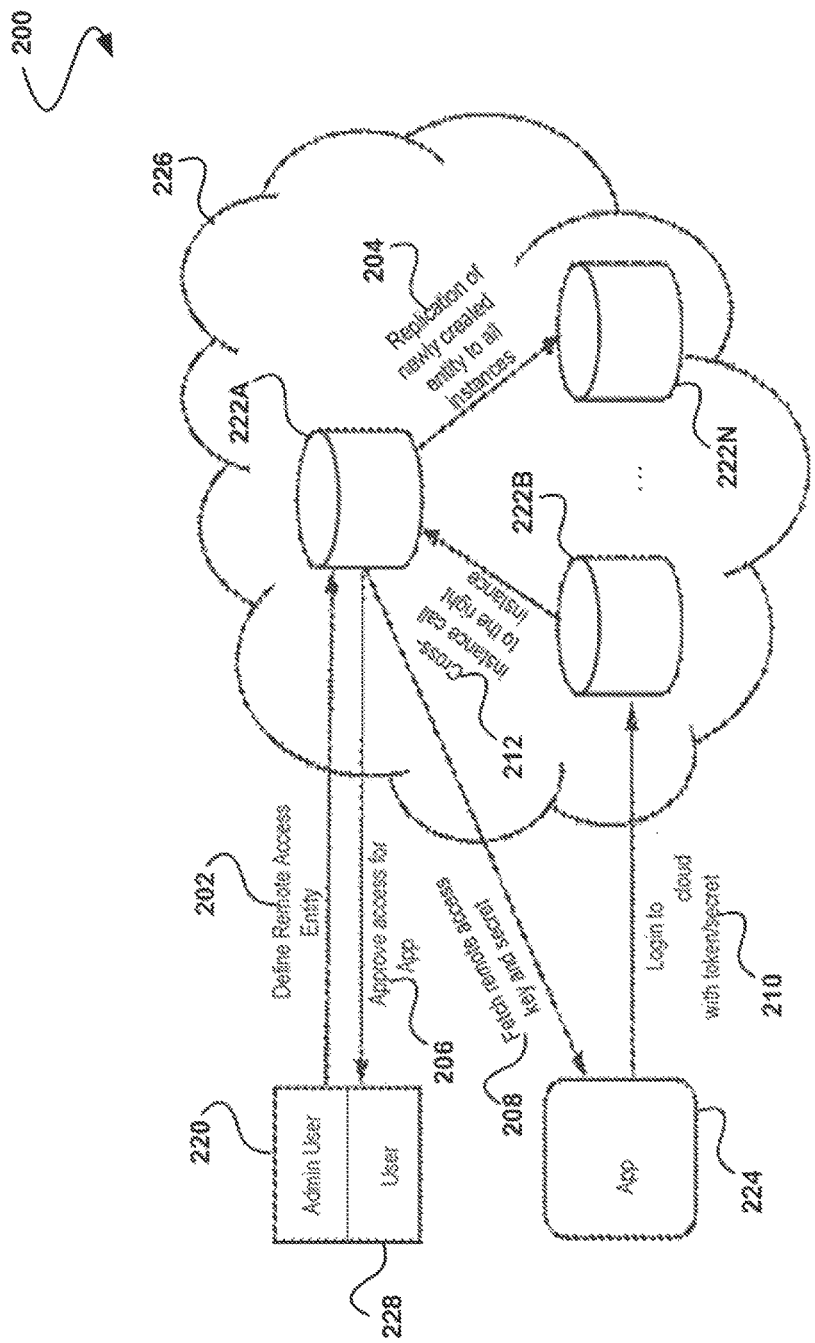
FIG. 2 illustrates a system and method for performing external application verification, in accordance with another embodiment.

FIG. 2 illustrates a system and method 200 for performing external application verification, in accordance with another embodiment. As an option, the present system and method 200 may be carried out in the context of the functionality of FIG. 1. Of course, however, the system and method 200 may be carried out in any desired environment. The aforementioned definitions may apply during the present description.

As shown in operation 202, an administrative user 220 defines a remote access entity object for a third party application 224 at a first instance 222A of a multi-tenant on-demand database system 226. In one embodiment, the remote access entity object may be defined within an organization of the administrative user 220. In another embodiment, the remote access entity object may describe the third party application 224 and may be used by the third party application 224 to access one or more protected resources of the organization associated with the administrative user 220. In yet another embodiment, the remote access entity object may be defined by the administrative user 220 using an organization setup page.

Additionally, as shown in operation 204, upon the creation of the remote access entity object, a new key used to identify the third party application 224 and a corresponding secret are generated and globally replicated to all instances 222A-N in the multi-tenant on-demand database system 226. In this way, regardless of which instance the third party application 224 attempts to log in to, the login request may always be routed back to the correct instance containing the organization associated with the administrative user 220 where the remote access entity object was defined. As such, the third party application 224 may not need to know the specific instance within the multi-tenant on-demand database system 226 where the remote access entity object was defined. Also, in one embodiment, the new key and corresponding secret may be different from the user name and password of the administrative user 220 for the system 226.

Further, as shown in operation 206, an end user 228 approves access for the third party application 224. In one embodiment, when the third party application 224 attempts to access protected data from the end user 228's organization located at the multi-tenant on-demand database system 226 for the first time, the system 226 may redirect the third party application 224's request to a login page of the system 226. The end user 228 may then log in to their organization utilizing the login page of the system 226 (e.g., utilizing their user name and password for the system 226) and may approve access for the third party application 224. In this way, the login information for the end user 228 is not revealed to the third party application 224.

Further still, as shown in operation 208, in response to the end user 228 approving access for the third party application 224, the third party application 224 fetches the remote access key and corresponding secret from the instance 224A of the multi-tenant on-demand database system 226. For example, the multi-tenant on-demand database system 226 may send the key and secret to the third party application 224 for use in subsequent calls by the third party application 224 to obtain protected data from the organization of the end user 228 on behalf of the end user 228.

Additionally, as s own in operation 210, the third party application 224 logs in to the multi-tenant on-demand database system 226 at instance 222B of the system 226, using the remote access key and corresponding secret. In one embodiment, the third party application 224 may log in to the multi-tenant on-demand database system 226 in order to retrieve data associated with the end user 228 (e.g., data within the end user 228's organization in the system 226, etc.).

Furthermore, as shown in operation 212, a cross-instance call is made from instance 222B, where the third party application 224 logged in, to instance 222A, where the third party application 224's login is verified. In this way, the third party application 224's login request may be routed back to the correct instance 222A containing the organization associated with the end user 228. Additionally, in conjunction with the remote access key and corresponding secret, the third party application 220 may retrieve protected data from the multi-tenant on-demand database system 226 without having to first ask the end user 228 to reveal their user name and password for the system 226 to the third party application 220.

System Overview

Figure 3:
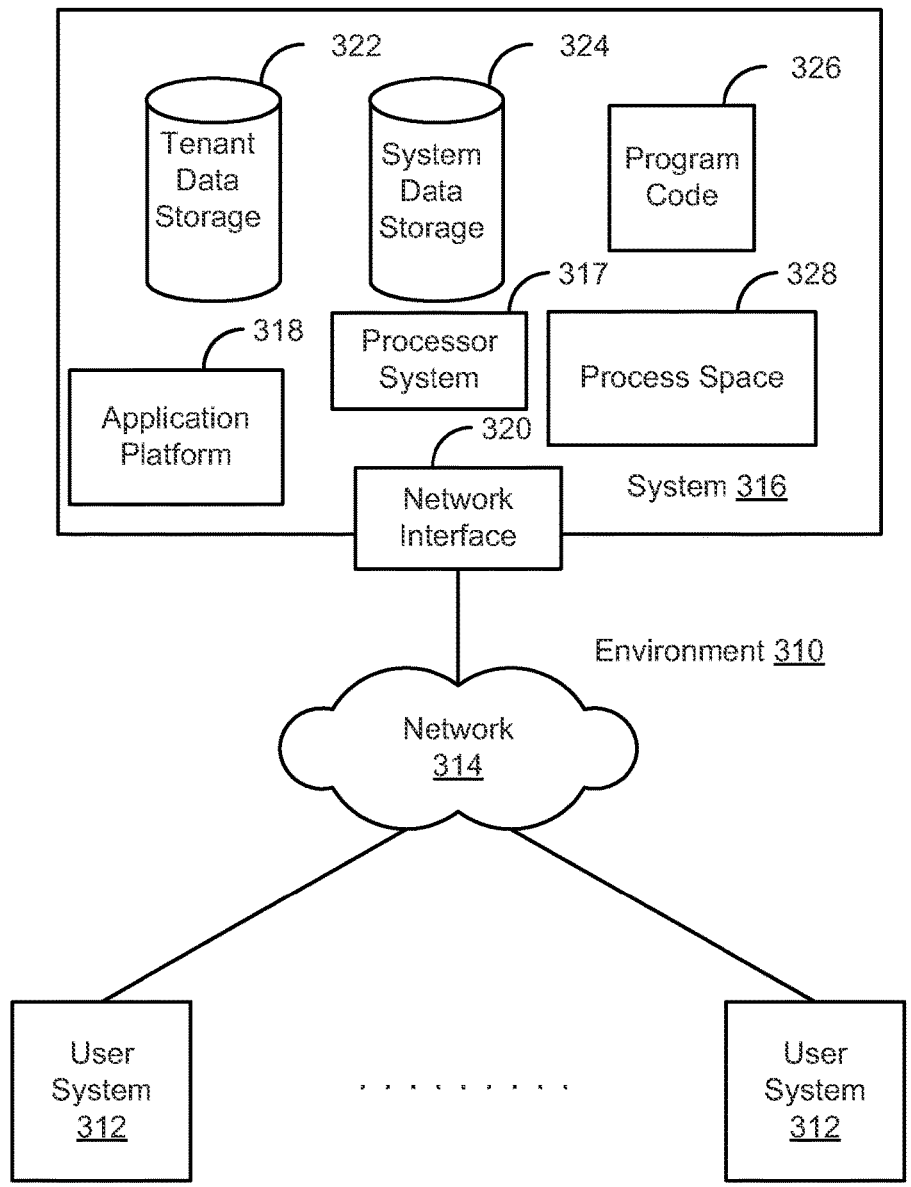
FIG. 3 illustrates a block diagram of an example of an environment wherein an on-demand database system might be used.

FIG. 3 illustrates a block diagram of an environment 310 wherein an on-demand database system might be used. Environment 310 may include user systems 312, network 314, system 316, processor system 317, application platform 318, network interface 320, tenant data storage 322, system data storage 324, program code 326, and process space 328. In other embodiments, environment 310 may not have all of the components listed and/or may have other elements instead of, or in addition to, those listed above.

Environment 310 is an environment in which an on-demand database system exists. User system 312 may be any machine or system that is used by a user to access a database user system. For example, any of user systems 312 can be a handheld computing device, a mobile phone, a laptop computer, a work station, and/or a network of computing devices. As illustrated in FIG. 3 (and in more detail in FIG. 4) user systems 312 might interact via a network 314 with an on-demand database system, which is system 316.

An on-demand database system, such as system 316, is a database system that is made available to outside users that do not need to necessarily be concerned with building and/or maintaining the database system, but instead may be available for their use when the users need the database system (e.g., on the demand of the users). Some on-demand database systems may store information from one or more tenants stored into tables of a common database image to form a multi-tenant database system (MTS). Accordingly, "on-demand database system 316" and "system 316" will be used interchangeably herein. A database image may include one or more database objects. A relational database management system (RDMS) or the equivalent may execute storage and retrieval of information against the database object(s). Application platform 318 may be a framework that allows the applications of system 316 to run, such as the hardware and/or software, e.g., the operating system. In an embodiment, on-demand database system 316 may include an application platform 318 that enables creation, managing and executing one or more applications developed by the provider of the on-demand database system, users accessing the on-demand database system via user systems 312, or third party application developers accessing the on-demand database system via user systems 312.

The users of user systems 312 may differ in their respective capacities, and the capacity of a particular user system 312 might be entirely determined by permissions (permission levels) for the current user. For example, where a salesperson is using a particular user system 312 to interact with system 316, that user system has the capacities allotted to that salesperson. However, while an administrator is using that user system to interact with system 316, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 314 is any network or combination of networks of devices that communicate with one another. For example, network 314 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 312 might communicate with system 316 using TCP/IP and, at a higher network level, use other common Internet protocols to communicate, such as HTTP, FTP, AFS, WAP, etc. In an example where HTTP is used, user system 312 might include an HTTP client commonly referred to as a "browser" for sending and receiving HTTP messages to and from an HTTP server at system 316. Such an HTTP server might be implemented as the sole network interface between system 316 and network 314, but other techniques might be used as well or instead. In some implementations, the interface between system 316 and network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 316, shown in FIG. 3, implements a web-based customer relationship management (CRM) system. For example, in one embodiment, system 316 includes application servers configured to implement and execute CRM software applications as well as provide related data, code, forms, webpages and other information to and from user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 316 implements applications other than, or in addition to, a CRM application. For example, system 316 may provide tenant access to multiple hosted (standard and custom) applications, including a CRM application. User (or third party developer) applications, which may or may not include CRM, may be supported by the application platform 318, which manages creation, storage of the applications into one or more database objects and executing of the applications in a virtual machine in the process space of the system 316.

One arrangement for elements of system 316 is shown in FIG. 3, including a network interface 320, application platform 318, tenant data storage 322 for tenant data 323, system data storage 324 for system data 325 accessible to system 316 and possibly multiple tenants, program code 326 for implementing various functions of system 316, and a process space 328 for executing MTS system processes and tenant-specific processes, such as running applications as part of an application hosting service. Additional processes that may execute on system 316 include database indexing processes.

Several elements in the system shown in FIG. 3 include conventional, well-known elements that are explained only briefly here. For example, each user system 312 could include a desktop personal computer, workstation, laptop, PDA, cell phone, or any wireless access protocol (WAP) enabled device or any other computing device capable of interfacing directly or indirectly to the Internet or other network connection. User system 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 312 to access, process and view information, pages and applications available to it from system 316 over network 314. Each user system 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 316 or other systems or servers. For example, the user interface device can be used to access data and applications hosted by system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 312 and all of its components are operator configurable using applications, such as a browser, including computer code run using a central processing unit such as an Intel Pentium® processor or the like. Similarly, system 316 (and additional instances of an MTS, where more than one is present) and all of their components might be operator configurable using application(s) including computer code to run using a central processing unit such as processor system 317, which may include an Intel. Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 316 is configured to provide webpages, forms, applications, data and media content to user (client) systems 312 to support the access by user systems 312 as tenants of system 316. As such, system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 4:
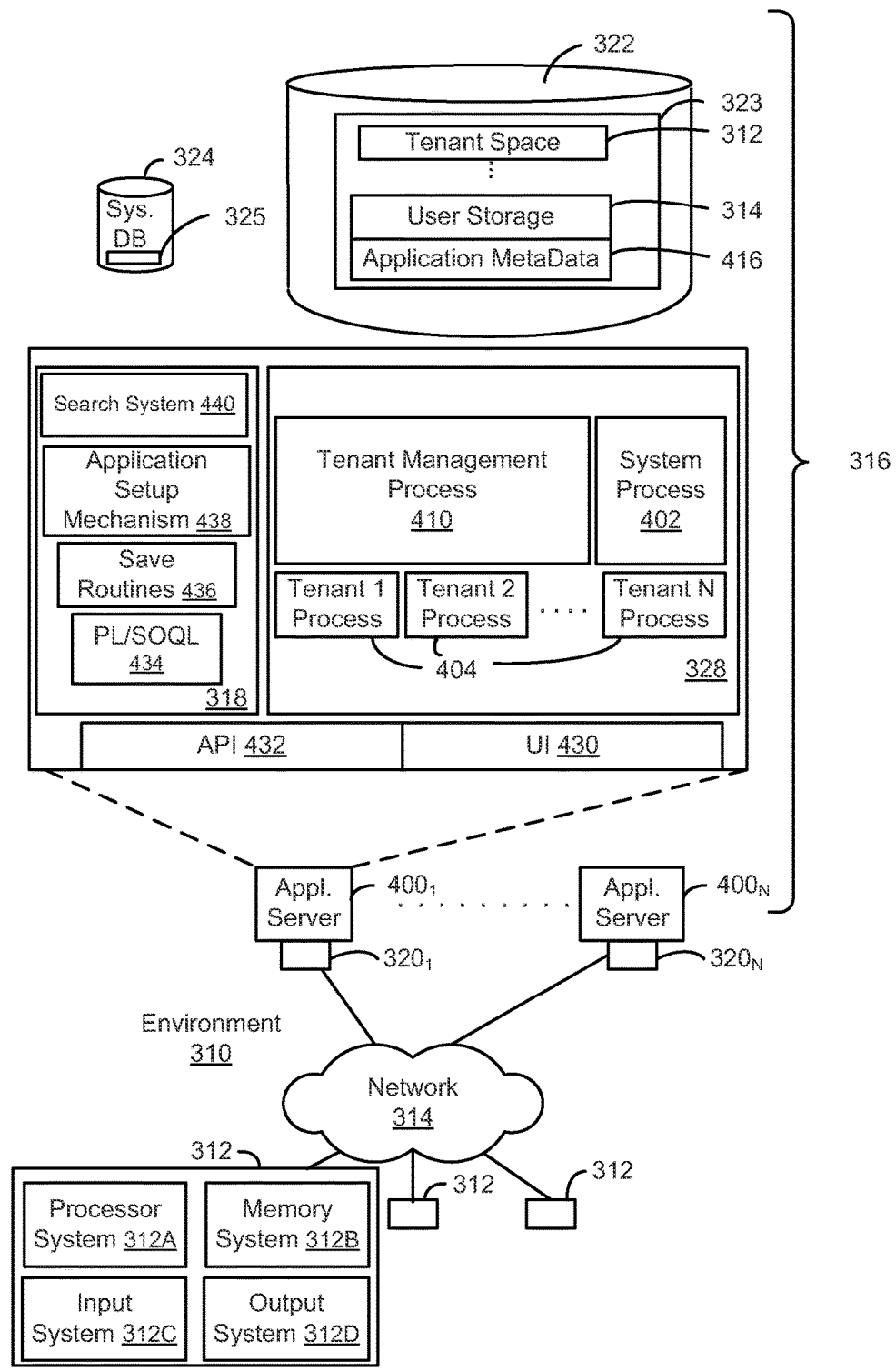
FIG. 4 illustrates a block diagram of an embodiment of elements of FIG. 4 and various possible interconnections between these elements.

FIG. 4 also illustrates environment 310. However, in FIG. 4 elements of system 316 and various interconnections in an embodiment are further illustrated. FIG. 4 shows that user system 312 may include processor system 312A, memory system 312B, input system 312C, and output system 312D. FIG. 4 shows network 314 and system 316. FIG. 4 also shows that system 316 may include tenant data storage 322, tenant data 323, system data storage 324, system data 325, User Interface (UI) 430, Application Program Interface (API) 432, PL/SOQL 434, save routines 436, application setup mechanism 438, applications servers $400_1$-$400_N$, system process space 402, tenant process spaces 404, tenant management process space 410, tenant storage area 412, user storage 414, and application metadata 416. In other embodiments, environment 310 may not have the same elements as those listed above and/or may have other elements instead of, or in addition to, those listed above.

User system 312, network 314, system 316, tenant data storage 322, and system data storage 324 were discussed above in FIG. 3. Regarding user system 312, processor system 312A may be any combination of one or more processors. Memory system 312B may be any combination of one or more memory devices, short term, and/or long term memory. Input system 312C may be any combination of input devices, such as one or more keyboards, mice, trackballs, scanners, cameras, and/or interfaces to networks. Output system 312D may be any combination of output devices, such as one or more monitors, printers, and/or interfaces to networks. As shown by FIG. 4, system 316 may include a network interface 320 (of FIG. 3) implemented as a set of HTTP application servers 400, an application platform 318, tenant data storage 322, and system data storage 324. Also shown is system process space 402, including individual tenant process spaces 404 and a tenant management process space 410. Each application server 400 may be configured to tenant data storage 322 and the tenant data 323 therein, and system data storage 324 and the system data 325 therein to serve requests of user systems 312. The tenant data 323 might be divided into individual tenant storage areas 412, which can be either a physical arrangement and/or a logical arrangement of data. Within each tenant storage area 412, user storage 414 and application metadata 416 might be similarly allocated for each user. For example, a copy of a user's most recently used (MRU) items might be stored to user storage 414. Similarly, a copy of MRU items for an entire organization that is a tenant might be stored to tenant storage area 412. A UI 430 provides a user interface and an API 432 provides an application programmer interface to system 316 resident processes to users and/or developers at user systems 312. The tenant data and the system data may be stored in various databases, such as one or more Oracle™ databases.

Application platform 318 includes an application setup mechanism 438 that supports application developers' creation and management of applications, which may be saved as metadata into tenant data storage 322 by save routines 436 for execution by subscribers as one or more tenant process spaces 404 managed by tenant management process 410 for example. Invocations to such applications may be coded using PL/SOQL 434 that provides a programming language style interface extension to API 432. A detailed description of some PL/SOQL language embodiments is discussed in commonly owned U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 416 for the subscriber making the invocation and executing the metadata as an application in a virtual machine.

Each application server 400 may be communicably coupled to database systems, e.g., having access to system data 325 and tenant data 323, via a different network connection. For example, one application server $400_1$ might be coupled via the network 314 (e.g., the Internet), another application server $400_{N-1}$ might be coupled via a direct network link, and another application server $400_N$ might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also can be used. For example, in certain embodiments, three consecutive requests from the same user could hit three different application servers 400, and three requests from different users could hit the same application server 400. In this manner, system 316 is multi-tenant, wherein system 316 handles storage of, and access to, different objects, data and applications across disparate users and organizations.

As an example of storage, one tenant might be a company that employs a sales force where each salesperson uses system 316 to manage their sales process. Thus, a user might maintain contact data, leads data, customer follow-up data, performance data, goals and progress data, etc., all applicable to that user's personal sales process (e.g., in tenant data storage 322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 316 might also maintain system level data usable by multiple tenants or other data. Such system level data might include industry reports, news, postings, and the like that are sharable among tenants.

In certain embodiments, user systems 312 (which may be client systems) communicate with application servers 400 to request and update system-level and tenant-level data from system 316 that may require sending one or more queries to tenant data storage 322 and/or system data storage 324. System 316 (e.g., an application server 400 in system 316) automatically generates one or more SQL statements (e.g., one or more SQL queries) that are designed to access the desired information. System data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A non-transitory computer readable medium having program instructions stored thereon that are capable of causing a computer system that implements a plurality of instances of a multi-tenant database system to perform operations comprising:
   receiving, from a user, a request to permit an application to access data of a tenant that is stored in a first of the plurality of instances of the multi-tenant database system, wherein the application is executable externally from the multi-tenant database system;
   in response to receiving the request, generating authentication information for the application, wherein the authentication information is usable to authenticate the application;
   distributing the authentication information to the plurality of instances of the multi-tenant database system;

receiving, from the application at a second of the plurality of instances of the multi-tenant database system, a request for the data stored in the first instance; and in response to the second instance receiving the authentication information from the application, returning the requested data from the first instance.

2. The computer readable medium of claim 1, wherein the receiving includes:

receiving a user name and password for the user; and verifying the user name and password for the user prior to generating the authentication information for the application, wherein the authentication information is distinct from the user name and password.

3. The computer readable medium of claim 1, wherein the operations further comprise:

storing an object identifying that the application is permitted access in the first instance of the multi-tenant database system.

4. The computer readable medium of claim 1, wherein the authentication information includes an identifier of the application and a secret value to be presented by the application.

5. The computer readable medium of claim 1, wherein the operations further comprise:

providing a web page for receiving the request from the user.

6. The computer readable medium of claim 1, wherein the data of the tenant includes a plurality of files.

7. The computer readable medium of claim 1, wherein the data of the tenant includes contact information specifying names and addresses of people.

8. A method, comprising:

receiving, at a first instance of a database system, a request from a user to permit an entity to access data stored in the first instance of the database system, wherein the entity is an entity external to the database system and provides a service using the data, and wherein the first instance is one of a plurality of instances of the database system;

in response to the request:

creating, at the first instance, authentication information that is usable to authenticate the entity; and distributing, from the first instance, the authentication information to the plurality of instances of the database system such that the entity is able to authenticate with another one of the plurality of instances to access data stored in the first instance of the database system;

receiving, at a second of the plurality of instances, the authentication information with a request from the entity for data stored in the database system; and in response to receiving the authentication information, the second instance providing data from the first instance to the entity to service the request from the entity.

9. The method of claim 8, wherein the entity is an application executed on a computer system external to the database system.

10. The method of claim 8, wherein the entity is a web site external to the database system.

11. The method of claim 8, wherein the database system stores information for a plurality of tenants, and wherein the user is associated with one of the plurality of tenants.

12. The method of claim 11, wherein the tenant associated with the user is an organization, and wherein the user is an administrator for the organization.

13. The method of claim 8, wherein the receiving includes:

receiving authentication information of the user; and verifying the authentication information of the user, wherein the authentication information of the user is different from the created authentication information usable to authenticate the entity.

14. The method of claim 8, further comprising:

the first instance storing, with the stored data, an object identifying that the entity is permitted to access the stored data.

15. A non-transitory computer readable medium having program instructions stored thereon that are capable of causing a computer system that implements a first of a plurality of instances of a database system to perform operations comprising:

receiving, from a second of the plurality of instances, authentication information generated at the second instance, wherein the authentication information is for an entity external to the database system and usable to access data stored at the second instance;

receiving, from the entity, an authentication request that includes the authentication information; and in response to verifying the authentication information from the entity, providing data from the second instance to the entity.

16. The computer readable medium of claim 15, wherein the operations further comprise:

presenting a web page for the entity to provide the authentication information.

17. The computer readable medium of claim 15, wherein the database system is a multi-tenant database system, and wherein the data stored in the second instance is data of one of a plurality of tenants.

18. The computer readable medium of claim 15, wherein the authentication information includes an identifier of the entity and a secret known to the entity.

* * * * *